(12) United States Patent
Anderson et al.

(10) Patent No.: US 10,494,280 B2
(45) Date of Patent: Dec. 3, 2019

(54) TREATMENT OF ALKALINE BAUXITE RESIDUE

(71) Applicant: Rio Tinto Alcan International Limited, Montreal (CA)

(72) Inventors: John Victor Anderson, Tennyson (AU); Jean-Marc Rousseaux, Brisbane (AU); Guy Peloquin, Jonquière (CA); Ben O'Brien, Nhulunbuy (AU)

(73) Assignee: Rio Tinto Alcan International Limited, Montreal (CA)

( * ) Notice: Subject to any disclaimer, the term of this patent is extended or adjusted under 35 U.S.C. 154(b) by 0 days.

(21) Appl. No.: 14/441,449

(22) PCT Filed: Oct. 21, 2013

(86) PCT No.: PCT/CA2013/050792
§ 371 (c)(1),
(2) Date: May 7, 2015

(87) PCT Pub. No.: WO2014/071513
PCT Pub. Date: May 15, 2014

(65) Prior Publication Data
US 2015/0284278 A1    Oct. 8, 2015

(30) Foreign Application Priority Data
Nov. 7, 2012 (AU) .................................. 2012904908

(51) Int. Cl.
*C02F 9/00* (2006.01)
*A62D 3/33* (2007.01)
(Continued)

(52) U.S. Cl.
CPC ............... *C02F 9/00* (2013.01); *A62D 3/33* (2013.01); *C01F 7/005* (2013.01); *C01F 7/02* (2013.01);
(Continued)

(58) Field of Classification Search
CPC .................................................... C02F 1/5236
See application file for complete search history.

(56) References Cited

U.S. PATENT DOCUMENTS 3,954,606 A * 5/1976 Block ..................... C02F 3/16
210/604
4,525,280 A * 6/1985 Vasconcellos ............ C02F 1/52
210/728
(Continued)

OTHER PUBLICATIONS

Jan. 8, 2014—(WO) International Search Report and Written Opinion—App PCT/CA2013/050792.
Palmer, Sara J., et al., "The effect of high concentrations of calcium hydroxide in neutralized synthetic supernatant liquor: implications for alumina refinery residues", J. Ind. Engg. Chemistry (2011), vol. 17, No. 3, pp. 56-61, entire document.

*Primary Examiner* — Peter Keyworth
(74) *Attorney, Agent, or Firm* — Gregory G. Schlenz

(57) ABSTRACT

A process is disclosed for treating a Bayer process waste comprising a slurry containing bauxite residue and dissolved aluminum. The process comprises supplying the waste to a settling area to cause the bauxite residue to settle out of the slurry, thereby producing a supernatant liquor. The process further comprises neutralizing the supernatant liquor with a solution containing magnesium and calcium to produce a neutralized slurry containing precipitated hydrotalcites and thickening the neutralized slurry to produce a clarified effluent and a compacted slurry containing the precipitated hydrotalcites, part of said compacted slurry being recirculated to the supernatant liquor to be neutralized and/or directly to the neutralizing step. The clarified effluent and the compacted slurry are disposed of separately. Also disclosed is a plant for treating a Bayer process waste.

25 Claims, 2 Drawing Sheets

(51) Int. Cl.

| | | |
|---|---|---|
| *C02F 1/52* | (2006.01) | |
| *C01F 7/00* | (2006.01) | |
| *C01F 7/06* | (2006.01) | |
| *C01F 7/02* | (2006.01) | |
| *C02F 1/66* | (2006.01) | |
| *C22B 3/12* | (2006.01) | |
| *C02F 103/16* | (2006.01) | |
| *A62D 101/24* | (2007.01) | |
| *A62D 101/43* | (2007.01) | |
| *C02F 101/10* | (2006.01) | |

(52) U.S. Cl.
CPC ............ *C01F 7/066* (2013.01); *C02F 1/5236* (2013.01); *C02F 1/66* (2013.01); *C22B 3/12* (2013.01); *A62D 2101/24* (2013.01); *A62D 2101/43* (2013.01); *C02F 2101/10* (2013.01); *C02F 2103/16* (2013.01)

(56) References Cited

U.S. PATENT DOCUMENTS

| | | | | |
|---|---|---|---|---|
| 5,540,839 | A * | 7/1996 | Pirt | C02F 3/1263 |
| | | | | 210/605 |
| 5,672,280 | A * | 9/1997 | Demopoulos | C02F 1/66 |
| | | | | 210/709 |
| 7,077,963 | B2 | 7/2006 | McConchie et al. | |
| 2006/0144797 | A1 | 7/2006 | McConchie et al. | |
| 2008/0257827 | A1* | 10/2008 | Dai | B03D 3/06 |
| | | | | 210/729 |
| 2014/0231359 | A1* | 8/2014 | Cote | C01B 25/32 |
| | | | | 210/710 |

\* cited by examiner

TREATMENT OF ALKALINE BAUXITE RESIDUE

CROSS-REFERENCE TO RELATED APPLICATIONS

The present application is a U.S. National Phase of International Application No. PCT/CA2013/050792, filed on Oct. 21, 2013, designating the United States of America and claiming priority to Australian Patent Application No. 2012904908, filed Nov. 7, 2012, and this application claims priority to and the benefit of the above-identified applications, each of which is incorporated by reference herein in its entirety.

TECHNICAL FIELD

The invention disclosed relates to the production of alumina from bauxite. In particular, it relates to waste produced by the Bayer process in the course of extracting alumina from bauxite. More particularly, a process is disclosed for treating a Bayer process waste comprising bauxite residue and dissolved alumina.

BACKGROUND ART

Subjecting bauxite to the Bayer process produces a pregnant caustic liquor containing dissolved alumina and a bauxite residue slurry. In order to extract alumina from the pregnant liquor, it is first subjected to solid liquid separation steps to separate the bauxite residue. The alumina-bearing liquor is then treated to precipitate aluminium trihydroxide that is subsequently refined to produce alumina, which is in turn processed into aluminium metal.

The separated bauxite residue is often in the form of a slurry that contains a significant volume of caustic liquor. The slurry is delivered to storage ponds where the bauxite residue solids settle out of the liquor to provide a "red mud" and a supernatant liquor. Environmentally safe disposal of the red mud is problematic because it contains naturally occurring contaminants, such as heavy metals, in concentrations greater than naturally occurring concentrations. The same applies to an extent to the supernatant liquor, but it also has the added problem of being caustic.

While options are available for recycling part of the supernatant liquor back to the refinery process, this capacity may be constrained by other process limitations within the refinery. This excess supernatant liquor combined with unfavourable climatic conditions that may exist, result in an ever increasing requirement for the storage of supernatant liquor. In the absence of suitable treatment processes, many bauxite treatment plants simply store Bayer process waste in ponds without treatment to reduce its environmental impact.

There is a need, therefore, to provide a process that is capable of treating considerable quantities of Bayer process waste and, in particular, the supernatant liquor.

It is preferable for the process to be able to reduce current reserves of supernatant liquor held in storage ponds and/or to treat the Bayer process waste at about the same rate that it is produced.

SUMMARY OF THE DISCLOSURE

In one aspect there is disclosed a process for treating a Bayer process waste comprising a slurry containing bauxite residue and dissolved aluminium, the process comprising the steps of:

(a) supplying the waste to a settling area to cause the bauxite residue to settle out of the slurry, thereby producing a supernatant liquor;

(b) neutralizing the supernatant liquor with a solution containing magnesium and calcium to produce a neutralized slurry containing precipitated hydrotalcites;

(c) thickening the neutralized slurry to produce a clarified effluent and a compacted slurry containing the precipitated hydrotalcites; recirculating a stream of compacted slurry to the supernatant liquor fed to the neutralization step (b) and/or directly to the neutralization step (b); and (d) disposing of the clarified effluent and the compacted slurry separately.

This process enables anionic species to be captured by the precipitated hydrotalcite and subsequently removed from the supernatant liquor. This means that the liquid portion of waste from a Bayer process can be treated to remove heavy metals and other materials that make the untreated liquid portion unsuitable for disposal.

Moreover, treatment of liquid portion in the manner described above provides an alternative to current evaporation processes that are not suitable for areas that are subject to high rainfall. Accordingly, Bayer process waste from plants in such areas can be treated and be disposed of, rather than simply stored in large ponds. The applicant anticipates that the process is scalable to industrial application so that it can process the entire output of an industrial plant that operates a Bayer process. The volume of waste liquor will differ from plant to plant depending on the production capacity of a plant, but processing around 5 GL/yr of supernatant liquor is considered to be achievable.

The hydrotalcite forms by precipitation when the supernatant liquor is neutralized with the calcium and magnesium contents in the neutralizing solution. Through an extensive campaign of research work, the applicant has found that, although the hydrotalcite has a poorly crystallized form it is susceptible to settling at acceptable rates.

The applicant has also found that the process provides improved settling when the solids loading of the neutralized slurry is increased by recycling compacted slurry containing hydrotalcite to the neutralized slurry, to neutralization step (b) or to thickening step (c). In the case of the former two options, the applicant observes increased hydrotalcite precipitation and increased crystal growth. Both effects cause the solids loading of the neutralized slurry to increase and, therefore, improve settling properties of the precipitated hydrotalcite. Improved hydrotalcite precipitation also causes a greater quantity of anionic contaminants contained in the supernatant liquor to be captured in the hydrotalcite. This means that the contaminant loading of the clarified effluent is less than contaminant loading produced without recycling of compacted slurry.

As an example, the clarified effluent produced in step (c) may have an aluminum content of less than 1000 ppb, preferably less than 500 ppb and a pH of less than 9, preferably less than 8.8. Such low metal content may enable disposal of the clarified effluent directly to the environment.

The applicant has also found that adding a flocculant, selected to cause hydrotalcite interaction, to the neutralization step (b), to the neutralized slurry or to the thickening step (c) results in improved settling behaviour of hydrotalcite during the thickening step (c). The applicant observes that the hydrotalcite product of thickening step (c) is denser when compared to hydrotalcite product produced by the process when no flocculant is added. Higher settling rates accompany the denser hydrotalcite product. This means that higher treatment rates of Bayer process waste can be achieved and, therefore, higher volumes of Bayer process waste can be treated by the process according to this aspect when appropriate flocculant is added. It is believed by the applicant that the flocculant adjusts the surface chemistry of precipitated hydrotalcite and therefore causes the particles to stick together when they come into contact. The term "interaction", as used throughout the specification in respect of hydrotalcite interaction, will be taken to have this meaning.

Accordingly, the process according to this aspect comprises a further step of recirculating a stream of compacted slurry to the supernatant liquor fed to the neutralization step (b) and/or directly to the neutralized slurry. The quantity of compacted slurry that is recirculated may be selected to achieve a solids loading of at least 10 g/L in neutralized slurry sent to thickening step (c). The solids loading may be in the range of 10 to 30 g/L, preferably in the range of 10 to 20 g/L. Optionally, the compacted slurry is recirculated in quantities selected to provide a solids loading of 14 to 16 g/L.

Recirculating the compacted slurry may further comprise recirculating a stream of compacted slurry to the thickening step (c).

According to another aspect of the invention, the waste is supplied in step (a) to a plurality of ponds of the settling area, and the process further includes selecting supernatant liquors from different ponds having different chemical compositions and blending the selected supernatant liquors for producing the supernatant liquor to be neutralized in step (b).

In addition or alternatively, the process further includes selecting a Bayer process liquor stream having a different chemical composition than the supernatant liquor produced in step (a) or the selected supernatant liquors, and blending the selected Bayer process liquor stream with said supernatant liquor(s) produced in step (a) for producing the supernatant liquor to be neutralized in step (b).

Different chemical composition means that the components are different and/or the concentration of said components are different. The selected supernatant liquors from different ponds have different chemical compositions as a result of transfers of liquor between such ponds, rainfall collection, natural and forced evaporation processes, and biological and physio-chemical processes occurring naturally in these ponds.

Preferably, the step of selecting supernatant liquors from different ponds and/or a Bayer process liquor stream, and the step of blending together the supernatant liquor produced in step (a), the selected supernatant liquors from different ponds and/or the selected Bayer process liquor stream, are both achieved so that the supernatant liquor to be neutralized in step (b) has a molar ratio of carbonate to aluminium of at most 30:1, and optionally less than 15:1.

The blending of the selected supernatant liquors from different ponds, the supernatant liquor produced in step (a) and/or the selected Bayer process liquor stream, prior to the neutralization step (b) or through separate addition to the neutralization step (b), hereafter referred to as the blending operation, makes sure that there is sufficient removal of carbonate during hydrotalcites precipitation, and that there is not excess carbonate dissolved in the effluent. An excess carbonate dissolved in the effluent would continue reacting after discharge, resulting in ongoing precipitation of calcium carbonate in the settling step or discharge environment, making the effluent suspended solids not suitable to be discharge to the environment.

This blending operation may be carried out in a pre-mixing step, prior to the neutralization step (b), or through separate addition to the neutralization step (b).

The process may further comprise a step of adding flocculant, selected to cause hydrotalcite interaction, to steps (b) and/or (c) or to one or more inputs to steps (b) and/or (c).

According to one option, the flocculant may be diluted to 0.5 to 2.0 g/L by adding flocculant directly to the neutralizing solution input to the neutralization step (b).

According to another option, the flocculant may be diluted initially at a location remote from to a plant for carrying out the process according to this aspect, transferred to the plant and then diluted further to the required concentration prior to supply to the process. The initial dilution may be to 1.0 to 3.0 g/L by addition of fresh water and the further dilution may be to 0.5 to 1.0 g/L. In this case, the further dilution may be carried out by adding the same type of solution that is used as an input to neutralization step (b).

The two-stage dilution process reduces fresh water consumption and minimizes shear breakdown of the prepared flocculant during transfer.

The flocculant may be polymeric flocculant. The flocculant may be, for example, a low anionic polyacrylamide flocculant, preferably having less than 50% anionicity, more preferably having less than 20% anionicity, such as products in the FLOPAM group of flocculant sold by SNF.

Neutralization step (b) involves supplying the supernatant liquor and the magnesium containing neutralizing solution to a mixing vessel. The process may involve controlling conditions in the mixing vessel to produce neutralized slurry that enables a settling rate in a thickening step of at least 5 m/h and, optionally, at least 7 m/h. However, the applicant expects that a settling rate of more than 10 m/h may be achievable. The conditions in the mixing vessel may be controlled by adjusting the residence time of supernatant liquor in the mixing vessel and/or by adjusting the mixing intensity. It is believed that both play an important role in causing precipitation of hydrotalcite in a form and in quantities that enable settling rates as disclosed above to be achieved. On the basis of these settling rates, the applicant anticipates that the process can be scaled to treat waste streams from an industrial Bayer process at roughly the same rate that the waste stream is produced.

The process may involve controlling the supply of supernatant liquor and the magnesium containing solution such that the input supernatant liquor and the magnesium containing solution have a molar ratio of magnesium to aluminium in the range of at least 4:1.

The magnesium containing solution may be seawater and the supplied volume ratio of seawater to supernatant liquor may be in excess of the required volume ratio to achieve substantially full hydrotalcite precipitation. The supplied volume ratio of seawater to supernatant liquor may be at least 2.5:1. The volume ratio of seawater to supernatant liquor may be as much as 10:1. The excess seawater provides a diluting effect that acts as a buffer against the risk of poor quality effluent as a result of less than substantially full hydrotalcite precipitation.

The thickening step (c) may be controlled to produce the compacted slurry with a hydrotalcite loading of >100 g/L. Optionally, the thickening step (c) may be controlled to produce the compacted slurry with a hydrotalcite loading of 110 to 130 g/L. This may involve recirculating a stream of compacted slurry to a decanter that receives neutralized slurry from neutralization step (b) such that the hydrotalcite loading of the combined neutralized slurry and the compacted slurry fed to the decanter is >15 g/L.

The thickening step (c) may be further controlled to produce a clarified effluent having a hydrotalcite loading of <10 mg/L.

The process may further comprise operating steps (b) and (c) on a continuous basis. Operating steps (b) and (c) on a continuous basis may include continuous recirculation of compacted slurry to steps (b) and/or (c). The stability and performance of thickening in step (c) may be optimized by operating (b) and (c) with continuous slurry recirculation over a period of at least 24 hours.

Step (d) may involve removing hydrotalcite from the compacted slurry by dewatering a stream of the compacted slurry produced in thickening step (c). Alternatively, the disposal step (d) may involve mixing the compacted slurry directly with the residue stream of the refinery, eliminating the need for the dewatering step.

In another aspect of the invention, there is disclosed a plant for treating a Bayer process waste comprising a slurry containing bauxite residue and dissolved aluminium, the plant comprising:
(a) a settling area for receiving the Bayer process waste, wherein the settling area is adapted to cause the bauxite residue to settle out of the slurry, thereby producing a supernatant liquor;
(b) a mixing vessel for receiving the supernatant liquor and solution containing magnesium and calcium, the vessel being adapted to mix the supernatant liquor and the solution such that a neutralized slurry is formed with precipitated hydrotalcites in a form and in quantities suitable for separating the hydrotalcites from the neutralized slurry by a thickening process;
(c) a thickener for receiving the neutralized slurry and for producing a clarified effluent and a compacted slurry containing the precipitated hydrotalcites, and supply lines for recirculating compacted slurry from the thickener to one or more of the mixing vessel, the thickener or a supplying line for conveying the neutralized slurry from the mixing vessel to the thickener.

The settling area may comprise a plurality of ponds, and the plant may further comprise means for selecting supernatant liquors from different ponds having different chemical compositions and means for blending the selected supernatant liquors for producing the supernatant liquor received by the mixing vessel.

Alternatively or additionally, the plant may further comprise means for selecting a Bayer process liquor stream having a different chemical composition than the supernatant liquor produced in the settling area or the selected supernatant liquors, and means for blending the selected Bayer process liquor stream with said supernatant liquor(s) produced in the settling area for producing the supernatant liquor received by the mixing vessel (b).

Preferably, the means for selecting supernatant liquors from different ponds and/or a Bayer process liquor stream, and the means for blending together the supernatant liquor produced in the settling area, the selected supernatant liquors from different ponds and/or the selected Bayer process liquor stream, are both controlled so that the supernatant liquor received by the mixing vessel has a molar ratio of carbonate to aluminium of at most 30:1.

The plant may further comprise feed lines for delivering flocculant to one or more of the mixing vessel, a supply line for delivering the magnesium containing solution to the mixing vessel, the thickener or a supplying line for conveying the neutralized slurry from the mixing vessel to the thickener.

BRIEF DESCRIPTION OF THE DRAWINGS

Notwithstanding any other forms which may fall within the scope of the process and plant as set forth in the Summary, specific embodiments will now be described, by way of example only, with reference to the accompanying drawings, in which.

DESCRIPTION OF EMBODIMENT

Figure 1:
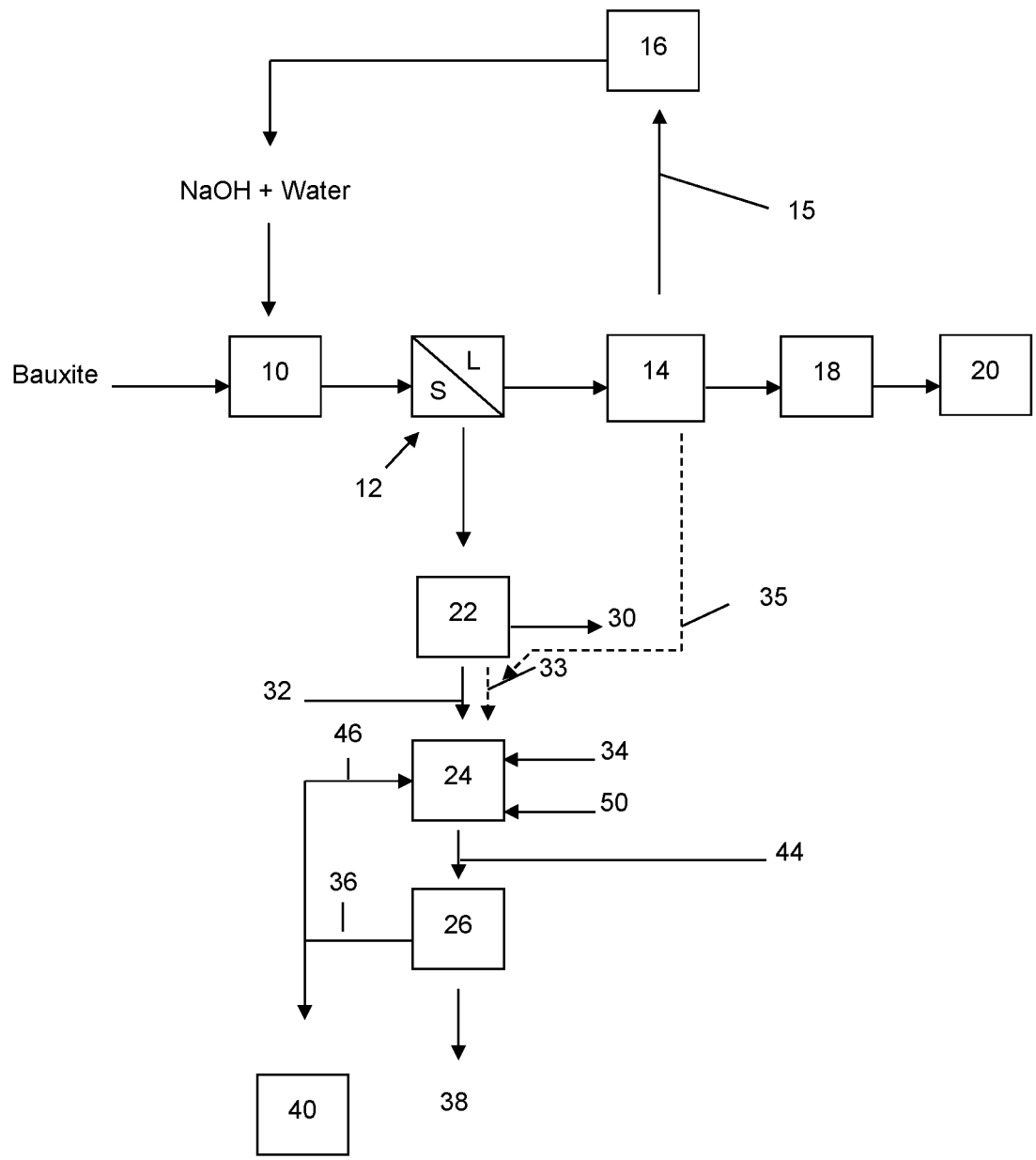
FIG. 1 is a flow chart of a Bayer process, downstream alumina production steps and a downstream waste treatment process according to the process set forth in the Summary.

With regard to FIG. 1, the Bayer process involves contacting bauxite with a hot solution of sodium hydroxide (NaOH) in a digester 10 to dissolve the alumina in the bauxite as aluminium hydroxide ($[Al(OH)_4]^-$), whilst other solid impurities from the bauxite remain largely undissolved.

The digester 10 operates at a temperature in the range of 140 to 280° C., depending upon the phase of aluminium oxide contained in the bauxite feed.

The hot solution, which is now loaded with aluminium trihydroxide, is then clarified in a settling and filtering stage 12 to remove solid impurities as waste. The products from this process are pregnant liquor and a Bayer process slurry waste stream containing gangue material suspended in a liquor stream containing caustic soda and dissolved aluminium.

The clarified pregnant liquor is then transferred to a precipitation stage 14, where the clarified liquor is cooled to cause aluminium trihydroxide ($Al(OH)_3$) to precipitate.

The aluminium trihydroxide is then separated from the liquor via gravity separation or vacuum filtration. The liquor is passed via line 15 to a caustic concentration stage 16 where water is evaporated from the residual clarified liquor. Residual liquor is returned back to the digester 10 to again contact fresh bauxite and to dissolve the alumina in the bauxite.

The aluminium trihydroxide from the precipitation stage 14 is washed via vacuum filters in a washing stage 18 to remove residual clarified liquor, thereby producing a washed aluminium trihydroxide filter cake.

The aluminium trihydroxide exiting the washing stage 18 is at a temperature of approximately 60° C. It then passes to pre-heating and calcination stages 20 for contact with hot air and combustion gases to reduce the moisture content of the aluminium trihydroxide filter cake from approximately 6 wt % to 0 wt % and to cause decomposition of the aluminium trihydroxide to smelter grade alumina.

The Bayer process waste stream from the settling and filtering stage 12 is sent to a settling area, in the form of a settling pond 22. Over time, the bauxite residue in the Bayer process waste stream settles under gravity to form a bed of "red mud" 30 in the settling pond 22 and, in doing so, leaves a supernatant liquor, carrying aluminium and other impurities, as a liquid layer above the "red mud" 30 pond bed. A stream 32 of supernatant liquor is recovered from the settling pond 22 and is sent to a neutralization stage which is carried out in a mixing vessel 24.

Practically, the settling pond may contain separate storage ponds containing supernatant liquors of different chemical compositions and concentration due to the operation of these ponds and natural processes. In this case, the supernatant liquor to be neutralized in the mixing vessel 24 can be produced from a blend of selected supernatant liquors from different ponds having different chemical compositions. In the embodiment represented in FIG. 1, the blending operation is carried out through separate addition to the mixing vessel 24 of two separate streams of supernatant liquor 32 and 33. Alternatively, the blending operation may be carried out in a pre-mixing vessel, before to the mixing vessel 24.

Additionally, the supernatant liquors 32 and 33 may require further blending with an additional Bayer process liquor stream, which may be a supernatant liquor from another settling pond stream within the settling area, and/or a liquor stream from another part of the Bayer process. In the embodiment represented in FIG. 1, the supernatant liquor to be neutralized in the mixing vessel 24 is produced from a blend of two separate streams 32 and 33 of supernatant liquor and another stream 35 recovered from the filtration of aluminium trihydrate in step 14. The selection of supernatant liquors streams 32 and 33 from different ponds and of the Bayer process liquor stream 35, and the blending of these streams are both achieved so that the resulting supernatant liquor to be neutralized in the mixing vessel 24 has a molar ratio of carbonate to aluminium of at most 30:1, preferably less than 15:1. In the embodiment represented in FIG. 1, the blending operation is carried out through separate addition to the mixing vessel 24 of three separate streams of 32, 33 and 35. Alternatively, the blending operation may be carried out in a pre-mixing vessel, before the mixing vessel 24.

A solution containing dissolved magnesium and calcium, in this case seawater 34 is supplied to the mixing vessel 24, together with a flocculant 50. The seawater 34 acts to neutralize the supernatant liquor. This causes hydrotalcite to precipitate with a chemical structure that captures aluminium and other impurities in the supernatant liquor 32, thereby removing them from the liquid phase.

The flocculant 50 is selected to cause an interaction between the hydrotalcite crystals to cause them to bind together. This produces clusters of hydrotalcite crystals. The clusters have a density that is greater than the density of loose hydrotalcite crystals and, as the applicant has found, results in the clusters having improved settling properties compared with loose hydrotalcite crystals. This is important in the context of treating large quantities of Bayer process wastes at rates that are the same as or similar to rates that the waste is generated by an industrial plant producing alumina.

To ensure that the supernatant liquors from streams 32 and 33 including the liquor from stream 35, are neutralized and that full hydrotalcite precipitation occurs, seawater is supplied to the mixing vessel 24 in quantities that are at least double the quantity of supernatant liquor 32 supplied to the mixing vessel 24. However, in practice, the ratio of seawater 34 to supernatant liquor supplied to the mixing vessel 24 that is made of supernatant liquors stream 32 and 33 and includes the liquor from stream 35, is in the ratio of 2.5:1 to 10:1. The excess seawater 34 provides a diluting effect and, therefore, does not impact upon neutralization and precipitation of hydrotalcite. The excess seawater 34 also provides a buffer against the risk of poor quality effluent in the event that less than substantially full hydrotalcite precipitation occurs.

The flocculant 50 added to the mixing vessel 24 comprises low anionic polyacrylamide flocculant. However, flocculants that cause the same hydrotalcite interaction properties or similar properties may be substituted in place of this flocculant.

The applicant has found that settling rates of at least 7 m/h can be achieved with flocculant dosing to the mixing vessel 24 of 500 g/t of solids in feed to a decanter 26, including recirculated solids fed by a recirculation line 46. However, the actual dose rate of flocculant is adjusted depending upon the solids loading in the feed to the decanter 26. Specifically, flocculant doses are increased for higher solids loading in the neutralized slurry 44 to ensure that sufficient flocculant is available to cause hydrotalcite interaction that result in sufficiently dense hydrotalcite clustering.

While the flocculant 50 may be added directly to the process, dose rates of flocculant may be controlled by diluting the flocculant prior to supply to the process. For example, the flocculant may be initially diluted with fresh water at a location remote from the mixing vessel 24 and then further diluted to the required concentration (i.e. around 500 g/t) at a location near the mixing vessel 24. The initial dilution may be with fresh water to achieve flocculant in the range of 1.0 to 3.0 g/l and the further dilution may be to 0.5 to 1.0 g/l. The further dilution, in accordance with the embodiment shown in FIGS. 1 and 2, comprises adding seawater to the initially diluted flocculant solution. Alternatively, the flocculant may be diluted to the dosage rate required in the process in a single dilution step.

Neutralized slurry 44 is sent to a thickening stage in the form of a decanter 26. The conditions within the decanter 26 are relatively quiescent so that the hydrotalcite settles in a relatively compacted form at the base of the decanter 26. The liquid phase near the top of the decanter 26 contains very low levels of hydrotalcite, for example less than 10 mg/l, and contains very low levels of dissolved aluminium and heavy metals. This liquid phase is allowed to flow from the decanter 26 as a clarified effluent 38. While some further processing may be necessary, the contaminant loading of the clarified effluent 38 is at levels that allow consideration for the clarified effluent 38 to be discharged to the environment.

The compacted hydrotalcite at the base of the decanter 26 is extracted as an underflow as a compacted slurry 36. Controlling conditions in the mixing vessel 24 and the decanter 26 produces a solids loading in the compacted slurry 36 of at least 120 g/L, and up to 200 g/L. A portion of the compacted slurry 36 is sent to a dewatering plant 40 to dewater the compacted slurry 36 in preparation for subsequent disposal of the hydrotalcite, or may be recycled and injected into the residue mud stream for co-disposal without dewatering.

Another portion of the compacted slurry 36 is returned to the mixing vessel 24 via recirculation line 46. The purpose of this is to provide hydrotalcite particles to the mixing vessel 24 as seeds to promote hydrotalcite precipitation and as part of the neutralization reaction. The purpose is also to increase the solids loading of the neutralized slurry 44 to around 15 g/L. Specifically, the applicant believes that achieving sufficient settling rates and achieving a suitably compacted slurry of hydrotalcite in the decanter 26 requires the solids loading in feed to the decanter 26, according to this embodiment, to be around 15 g/L. It is anticipated, however, that this target solids loading of feed to the decanter 26 may vary depending upon plant equipment and process chemistry. Nevertheless, the applicant recognises the importance of maintaining a sufficiently high solids loading in the neutralized slurry 44 as a factor that affects settling and compaction of hydrotalcite particles in the decanter 26.

Figure 2:
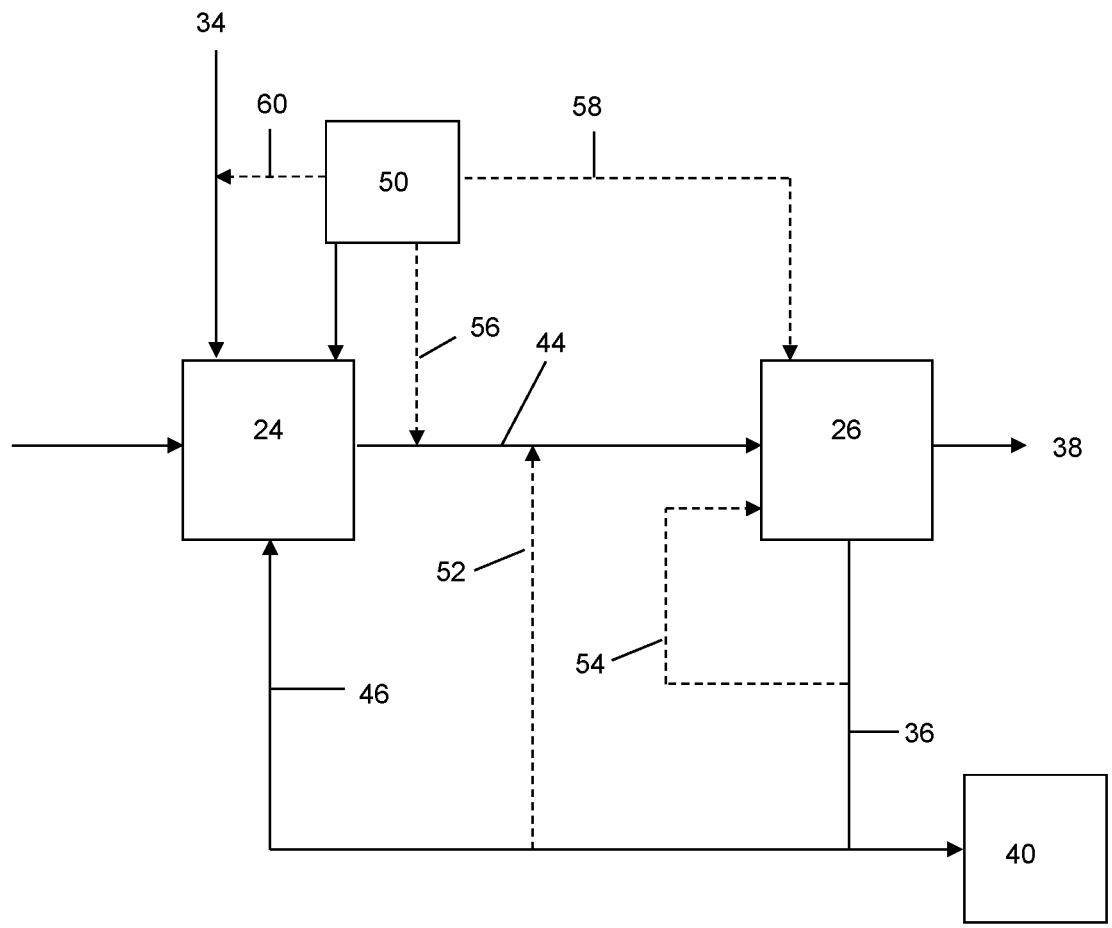
FIG. 2 is a schematic diagram of part of a plant that treats supernatant liquor and that produces clarified effluent from the treated supernatant liquor.

Referring to FIG. 2, the applicant recognises that the compacted slurry 36 may be sent via recirculation line 52 to a feed line carrying neutralized slurry 44 to the decanter 26.

Compacted slurry 36 is also recycled to the decanter 26 via recirculation line 54. The purpose of this recycling is to shear the settled hydrotalcite so that it remains in a compacted form as a slurry without significantly affecting the solids loading of the underflow extracted from the decanter 26. The recirculation would normally be maintained continuously in order to maintain the hydrotalcites in slurry form.

Although FIG. 1 shows flocculant 50 added to the mixing vessel 24 directly, it is possible to operate the process by additionally or alternatively adding the flocculant via a feed line 60 to the seawater 34 input to the mixing vessel 24, via a feed line 56 to the neutralized slurry 44 sent to the decanter 26 or via a feed line 58 directly into the decanter 26. Flocculant addition via feed line 60 may be part of a two-step flocculant dilution process with the second step being carried out by the addition of flocculant 50 to the seawater 34. Addition of flocculant 50 directly to the mixing vessel 24 via the feed line 56 or via the feed line 58 are representative of single-stage flocculant dilution to the final flocculant dosing level and supply to the process by the mentioned feed lines.

The applicant anticipates that the embodiment of the process shown in FIGS. 1 and 2 is capable of producing hydrotalcite settling rates of greater than 5 m/h and possibly greater than 10 m/h. This enables the process to be operated on an industrial scale to treat more than 5 GL/y of supernatant liquor obtained as waste from a Bayer process. This means that the process described in this embodiment is able to treat Bayer process waste at a rate roughly equivalent to the rate at which the waste is produced.

Whilst a number of specific apparatus and method embodiments have been described, it should be appreciated that the apparatus and method may be embodied in many other forms.

For example, the process described here and shown in FIGS. 1 and 2 is a continuous process, at least in respect of the treatment of supernatant liquor 32. In other words, supernatant liquor 32 is continuously extracted from settling pond 22 and a continuous stream of the liquor 32 is supplied to the mixing vessel 24, together with a continuous supply of seawater 34, recirculated compacted slurry 36 and flocculant 50. Optionally, supernatant liquor 33 is also continuously extracted from settling pond 22, and two continuous streams of supernatant liquors 32 and 33 as well as another Bayer process liquor stream 35 are supplied to the mixing vessel 24, together with a continuous supply of seawater 34, recirculated compacted slurry 36 and flocculant 50. The selection and the blend of streams 32, 33 and 35 are controlled so that the resulting composition of the streams 32, 33 and 35 continuously supplied to the mixing vessel 24 has a molar ratio of sodium carbonate to aluminium of at most 30:1, preferably less than 15:1. A continuous stream of neutralized slurry 44 leaves the mixing vessel 24 and is supplied on a continuous basis to the decanter 26. Compacted slurry 36 is continuously recycled to the decanted 26 via line 54. Clarified effluent 38 and compacted slurry 36 leave the decanter 26 as overflow and underflow respectively. However, it is not necessary that the process is operated on a fully continuous basis and the scope of the process is not limited to fully continuous operation. Accordingly, it will be appreciated that the one or more of the steps of process described here may be operated on a batch-wise basis.

In the claims which follow, and in the preceding description, except where the context requires otherwise due to express language or necessary implication, the word "comprise" and variations such as "comprises" or "comprising" are used in an inclusive sense, i.e. to specify the presence of the stated features but not to preclude the presence or addition of further features in various embodiments of the apparatus and method as disclosed herein.

The invention claimed is:

1. A process for treating a Bayer process waste comprising a slurry containing bauxite residue and dissolved aluminium, the process comprising the steps of:
   (a) supplying the waste to a settling area to cause the bauxite residue to settle out of the slurry, thereby producing a supernatant liquor, and blending the supernatant liquor with a Bayer process liquor stream to create a modified supernatant liquor with a desired composition;
   (b) neutralizing the modified supernatant liquor with a solution containing magnesium and calcium in a single neutralization step in a mixing vessel to produce a neutralized slurry containing precipitated hydrotalcites;
   (c) thickening the neutralized slurry in a thickener vessel to produce a clarified effluent and a compacted slurry containing the precipitated hydrotalcites;
   (d) recirculating a stream of compacted slurry to the supernatant liquor fed to the neutralization step (b) and/or directly to the neutralization step (b); and
   (e) disposing of the clarified effluent and the compacted slurry separately,
   wherein the process further comprises the step of adding flocculant, selected to cause hydrotalcite interaction, to steps (b) and/or (c) or to one or more inputs to steps (b) and/or (c).

2. The process according to claim 1, characterized in that a quantity of compacted slurry that is recirculated is selected to achieve a solids loading of at least 10 g/L in the neutralized slurry sent to the thickening step (c).

3. The process according to claim 1, characterized in that the process further comprises recirculating a stream of the compacted slurry to the thickening step (c).

4. The process according to claim 1, characterized in that the waste is supplied in step (a) to a plurality of ponds of the settling area, and characterized in that the process further includes selecting supernatant liquors from different ponds having different chemical compositions and blending the selected supernatant liquors for producing the modified supernatant liquor.

5. The process according to claim 1, characterized in that the process further includes:
   selecting the Bayer process liquor stream, such that the Bayer process liquor stream has a different chemical composition than the supernatant liquor produced in step (a).

6. The process according to claim 5, characterized in that the Bayer process liquor stream is selected so that the modified supernatant liquor to be neutralized in step (b) has a molar ratio of carbonate to aluminium of at most 30:1.

7. The process according to claim 1, characterized in that the flocculant is diluted to 0.5 to 2.0 g/L by adding flocculant directly to the solution input to neutralization step (b).

8. The process according to claim 1, characterized in that the process further comprises initially diluting flocculant at a location remote from a plant for carrying out the process, transferring the diluted flocculant to the plant and then diluting the flocculant further to a required concentration prior to supply to the process.

9. The process according to claim 1, characterized in that neutralization step (b) involves supplying the modified supernatant liquor and the solution to the mixing vessel and involves controlling conditions in the mixing vessel to produce the neutralized slurry that enables a settling rate at least 5 m/h in a thickening step.

10. The process according to claim 9, characterized in that the conditions in the mixing vessel are controlled by adjusting a residence time of the modified supernatant liquor in the mixing vessel and/or by adjusting a mixing intensity.

11. The process according to claim 1, characterized in that neutralizing step (b) further comprises controlling a supply of the modified supernatant liquor and solution such that the inputs of the modified supernatant liquor and the solution provide a molar ratio of magnesium to aluminium in a range of at least 4:1.

12. The process according to claim 1, characterized in that the solution is seawater, and the seawater and the modified supernatant liquor are supplied in a volume ratio in excess of a required volume ratio to achieve substantially full hydrotalcite precipitation.

13. The process according to claim 1, characterized in that the thickening step (c) is controlled to produce the compacted slurry with a hydrotalcite loading of >100 g/L.

14. The process according to claim 1, characterized in that thickening step (c) is controlled to produce the compacted slurry with a hydrotalcite loading of 110 to 130 g/L.

15. The process according to claim 1, characterized in that the process further comprises recirculating a stream of compacted slurry to a decanter that receives the neutralized slurry from neutralization step (b) such that a hydrotalcite loading of the combined neutralized slurry and the compacted slurry fed to the decanter is >15 g/L.

16. The process according to claim 1, characterized in that the thickening step (c) is further controlled to produce a clarified effluent having a hydrotalcite loading of <10 mg/L.

17. The process according to claim 1, characterized in that the process further comprises operating steps (b) and (c) on a continuous basis.

18. The process according to claim 1, characterized in that disposal step (d) involves removing hydrotalcite from the compacted slurry by dewatering a stream of the compacted slurry produced in thickening step (c).

19. The process of claim 1, wherein the neutralized slurry has a pH of less than 9.

20. The process of claim 1, wherein the blending of the supernatant liquor with the Bayer process liquor stream is performed in a pre-mixing vessel upstream from the mixing vessel.

21. The process of claim 1, wherein the blending of the supernatant liquor with the Bayer process liquor stream is performed in the mixing vessel.

22. A plant for treating a Bayer process waste comprising a slurry containing bauxite residue and dissolved aluminium, the plant comprising:

(a) a settling area for receiving the Bayer process waste, wherein the settling area is adapted to cause the bauxite residue to settle out of the slurry, thereby producing a supernatant liquor;
(b) means for blending the supernatant liquor with a Bayer process liquor stream to create a modified supernatant liquor with a desired composition;
(c) a single neutralization mixing vessel adapted to mix the modified supernatant liquor and a solution containing magnesium and calcium such that a neutralized slurry is formed in a single neutralization step with precipitated hydrotalcites in a form and in quantities suitable for separating the hydrotalcites from the neutralized slurry by a thickening process;
(d) a thickener vessel for receiving the neutralized slurry and for producing a clarified effluent and a compacted slurry containing the precipitated hydrotalcites; and
(e) supply lines for recirculating compacted slurry from the thickener vessel to one or more of the mixing vessel, the thickener vessel, or a supplying line for conveying the neutralized slurry from the mixing vessel to the thickener vessel, wherein the supply lines directly connect the thickener vessel to the one or more of the mixing vessel, the thickener vessel, or the supplying line for conveying the neutralized slurry from the mixing vessel to the thickener vessel,
wherein the plant is configured for adding flocculant, selected to cause hydrotalcite interaction, to the mixing vessel and/or the thickener vessel or to one or more inputs to the mixing vessel and/or the thickener vessel.

23. The plant of claim 22, wherein the means for blending further comprises a pre-mixing vessel connected to a plurality of inlet conduits for receiving multiple streams of the supernatant liquor and the Bayer process liquor stream and pre-mixing the multiple streams to achieve the modified supernatant liquor, the pre-mixing vessel further having an outlet conduit for delivering the modified supernatant liquor to the to the neutralization mixing vessel after the pre-mixing.

24. The plant of claim 22, wherein the means for blending further comprises a pre-mixing vessel for receiving the supernatant liquor and the Bayer process liquor stream and pre-mixing the supernatant liquor and the Bayer process liquor stream to achieve the modified supernatant liquor, the pre-mixing vessel further having an outlet conduit for delivering the modified supernatant liquor to the to the neutralization mixing vessel after the pre-mixing.

25. The plant of claim 22, wherein the means for blending is configured for blending the supernatant liquor and the Bayer process liquor stream in the neutralization mixing vessel.

* * * * *